United States Patent
Lee et al.

(10) Patent No.: US 7,139,780 B2
(45) Date of Patent: Nov. 21, 2006

(54) SYSTEM AND METHOD FOR SYNCHRONIZING FILES IN MULTIPLE NODES

(75) Inventors: Chung-I Lee, Tu-Chen (TW); Floye Lin, Shenzhen (CN); Benson Luo, Shenzhen (CN); Yekoo Wang, Shenzhen (CN)

(73) Assignees: Hong Fu Jin Precision Industry (Shenzhen) Co., Ltd., Shenzhen (CN); Hon Hai Precision Industry Co., Ltd., Tu-Cheng (TW)

( * ) Notice: Subject to any disclaimer, the term of this patent is extended or adjusted under 35 U.S.C. 154(b) by 453 days.

(21) Appl. No.: 10/335,516

(22) Filed: Dec. 30, 2002

(65) Prior Publication Data

US 2004/0068516 A1 Apr. 8, 2004

(30) Foreign Application Priority Data

Oct. 4, 2002 (TW) ................................ 91122978 A

(51) Int. Cl.
*G06F 17/00* (2006.01)

(52) U.S. Cl. ...................... 707/204; 707/203; 707/102; 707/101

(58) Field of Classification Search ..... 707/100–104.1, 707/3, 8, 10; 709/201
See application file for complete search history.

(56) References Cited

U.S. PATENT DOCUMENTS 6,026,413 A * 2/2000 Challenger et al. .......... 707/202
6,029,175 A * 2/2000 Chow et al. ............. 707/104.1

* cited by examiner

*Primary Examiner*—Sana Al-Hashemi
(74) *Attorney, Agent, or Firm*—Wei Te Chung

(57) ABSTRACT

A system and method for performing file synchronization in multiple nodes. The system includes a central node (120), and a plurality of local nodes (100) connected with the central node by a common communications network (110). Each local node includes a local application server (101), a local file server (103), and a local database (104). The central node includes a central application server (121), a central file server (123), and a central database (124). A synchronization program (122) running on the central application server downloads updated copies of files from the local file servers, and uploads the updated copies of files to the central file server as latest editions of the files. A proxy (102) running on each local application server updates copies of files in its respective local file server, and downloads latest editions of files from the central node.

8 Claims, 7 Drawing Sheets

Local File Information Table 130

| File Serial Number | File Name | File Directory | Update Time |
|---|---|---|---|
| . | . | . | . |
| . | . | . | . |
| . | . | . | . |

File Update Information Table 140

| File Serial Number | File Name | Original Directory | Update Time | Target Directory | Upload Completion |
|---|---|---|---|---|---|
| . | . | . | . | . | . |
| . | . | . | . | . | . |
| . | . | . | . | . | . |

SYSTEM AND METHOD FOR SYNCHRONIZING FILES IN MULTIPLE NODES

BACKGROUND OF THE INVENTION

1. Field of the Invention

The present invention relates to a system and method for synchronizing files, and especially to a system and method for synchronizing files in multiple nodes via a central node in a network.

2. Description of Related Art

A large enterprise that has branch offices distributed in different areas typically uses an intranet for communication among the branch offices. The intranet comprises a plurality of local area networks (LAN). Each LAN includes at least one server computer and a plurality of client computers, which together constitute a network computer system. A characteristic feature of the network computer system is that the server computers only store resources, and the client computers only run client side programs to communicate with the server computers.

The resources stored in server computers include server side programs, data for processing, and so on. In practice, a variety of server computers have different uses. For example, an application server is used for running server application programs, a file server is used for uploading and downloading files, and a database server is used for accessing a vast store of structured data.

Clients in the intranet may need to compile a file that is cooperatively shared among different LANs. The file server in each LAN stores one copy of the file. In these circumstances, file synchronization of the copies of the file in the different file servers should be performed. This is needed in order to maintain consistency between any updated copy in one file server and other copies in the other file servers.

P.R.China Patent No. CN1353836 discloses a system and method for managing files in a distributed environment. The invention includes a method for synchronizing files among different nodes in a network. According to the invention, a file controller is installed on the client side. The file controller is used for managing local files, exchanging data among nodes, and generating indexes for orientating files in a network. When a user in a node requires access to a file, the file controller obtains the storage location of the file according to the relevant indexes, copies the file to the node, and amends information in the relevant indexes. When the copy of the file is changed, the file controller performs file synchronization with all other nodes that have other copies of the file according to the indexes of the file.

However, the method disclosed in this invention is still relatively rudimentary. There are two important shortcomings, as described below.

First, unneeded file synchronization is performed. Suppose that there are 3 nodes in a network named nodes A, B, C; and each node has one copy of a same file. When node A updates its copy, the copy in node C is updated accordingly. When node B updates its copy, the copy in node C is updated accordingly, too. But node C accesses its own copy only after Node B updates its copy. That means the first file synchronization in node C is not needed.

Second, in some cases of file synchronization, excessively large network communication traffic is required. Suppose that a file is needed by every node in a network, and each node has one copy of the file. When a copy of the file in one of the nodes is changed, all the other nodes are required to perform file synchronization with said one of the nodes at the same time. In this case, relatively heavy network communication traffic is needed.

SUMMARY OF THE INVENTION

It is a general object of the present invention to provide a system and method for synchronizing files in multiple nodes, whereby a node performs file synchronization only when files in the node need to be accessed.

It is another object of the present invention to provide a system and method for synchronizing files in multiple nodes, whereby excessively large network communication traffic is avoided.

In order to achieve the aforementioned objects, the present invention provides a system for synchronizing files in multiple nodes. The system for synchronizing files in multiple nodes comprising a central node, and a plurality of local nodes connected with the central node by a network.

The local nodes act as servers in the network. Each local node comprises: a local file server that stores one copy of each file that is shared between the local nodes, and copies of files needing to be synchronized with corresponding files in the central node; a local database that stores information on copies of files in the local file server; and a local application server that runs a proxy to update copies of files in the local file server, and to download latest editions of corresponding files from the central node.

The central node acts as a server in the network, and comprises: a central database that records all update information on copies of files in all the local file servers; a central file server that stores latest editions of files that are shared between the local nodes; and a central application server comprising a synchronization program for update files in the central file server. The synchronization program downloads updated copies of files from the relevant local file servers, and updates the central file server accordingly.

In order to achieve the aforementioned objects, the present invention also provides a method for synchronizing files in multiple nodes. File synchronization is performed between a plurality of local nodes via a central node. The central node comprises a central application server, a central file server, and a central database. Each local node comprises a local application, a local file server, and a local database. The method for synchronizing files in multiple nodes comprises the following steps: (i) storing one copy of each file that is shared between the local nodes in each of the local file servers; (ii) creating a first table in each of the local databases to store information on copies of files in its respective local file server; (iii) creating a second table in the central database to record all update information on copies of files in all the local file servers; (iv) updating a copy of a file in one of the local file servers; (v) adding a new item of update information on the file in the second table; (vi) downloading the updated copy of the file from said one of the local file servers, and uploading the updated copy of the file to the central file server as the latest edition of the file; (vii) determining whether a required copy of the file in another of the local file servers needs to be updated; and (viii) downloading the latest edition of the file from the central file server to update said another of the local file servers if the required copy of the file needs to be updated.

Other objects, advantages and novel features of the present invention will be drawn from the following detailed description of preferred embodiments of the present invention with the attached drawings, in which:

DETAIL DESCRIPTION OF PREFERRED EMBODIMENTS OF THE INVENTION

Figure 1:
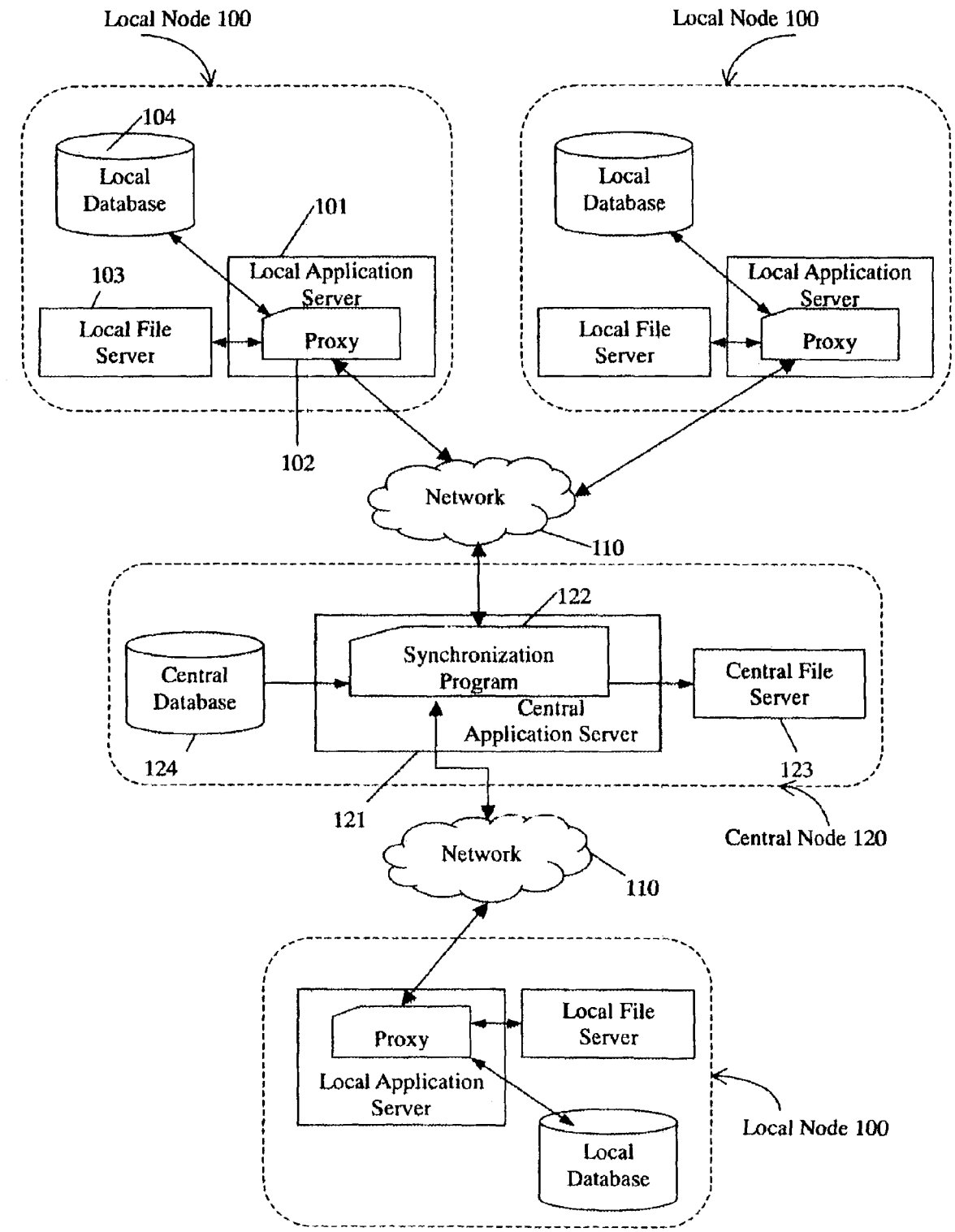
FIG. 1 is a schematic diagram of architecture of a system for synchronizing files in multiple nodes in accordance with a preferred embodiment of the present invention.

FIG. 1 is a schematic diagram of architecture of a system for synchronizing files in multiple nodes in accordance with a preferred embodiment of the present invention. The system for synchronizing files in multiple nodes comprises a central node 120, and a plurality of local nodes 100 connected with the central node 120 by a common communications network 110. The central node 120 comprises a central application server 121, a synchronization program 122, a central file server 123, and a central database 124. Each local node 100 comprises a local application server 101, a proxy 102, a local file server 103, and a local database 104.

The local nodes 100 act as servers in their respective local networks (not shown). Each local network is connected with the network 110 via a router or switch, and includes a plurality of client sides (not shown). The client sides run client application programs to send requests for file access to the local nodes 100. In the preferred embodiment of the present invention, each local node 100 has the same system architecture as the other local nodes 100. That is, each local node 100 can run its respective proxy 102 to accept file access requests from the client sides in the respective local network.

Each local application server 101 is any appropriate kind of computer as is known in the art, which is used to run various kinds of server application programs (not shown) such as a server edition of an integrated management studio.

Each proxy 102 runs on its respective local application server 101 as one of Dynamic Link Libraries (DLLs). The proxy 102 is called by its respective server application programs in order to determine whether copies of files in the local file server 103 need to be updated, and to download latest editions of corresponding files from the central node 120. These procedures are described in more detail below. A DLL is a library of executable functions or data that can be used by a Windows application program. Typically, a DLL provides one or more particular functions, and a program accesses the functions by creating a static or dynamic link to the DLL.

Each local file server 103 is any appropriate kind of computer combined with the appropriate software as is known in the art. The local file server 103 is connected with the local application server 101. The local file server 103 stores one copy of each file that is shared between the local nodes 100, and provides download and upload services.

Each local database 104 is connected with its respective local application server 101, and stores essential information on copies of files in the local file server 103. This is described in more detail below with reference to FIG. 3. The local database 104 needs a database management system (not shown) to run. The database management system may be a relational database system.

The network 110 is the Internet, an intranet, or a wide area network that comprises a plurality of local area networks connected together via routers and switches. Through the network 110, the local nodes 100 and the central node 120 can communicate with each other and perform file synchronization.

The central node 120 acts as a server in the network 110. The central node 120 comprises a central application server 121, a central file server 123, and a central database 124. The central application server 121 runs the synchronization program 122 therein, to updates files in the central file server 123. The central file server 123 stores the latest editions of the files that are shared between the local nodes 100. The central database 124 stores file update annals. The file update annals record all updating information on all copies of files in all the local file servers 103. This is described in more detail below with reference to FIG. 4.

In alternative embodiments of the present invention, any of the local nodes 100 may function as the central node 120 instead of the central node 120. If one of the local nodes 100 functions in this way, its local database 104 stores not only essential information on copies of files in its local file server 103, but also file update annals similar to those described above. Said local file server 103 functions in the same way as the above-described central file server 123. The above-described synchronization program 122 runs on the relevant local application server 101.

Figure 2:
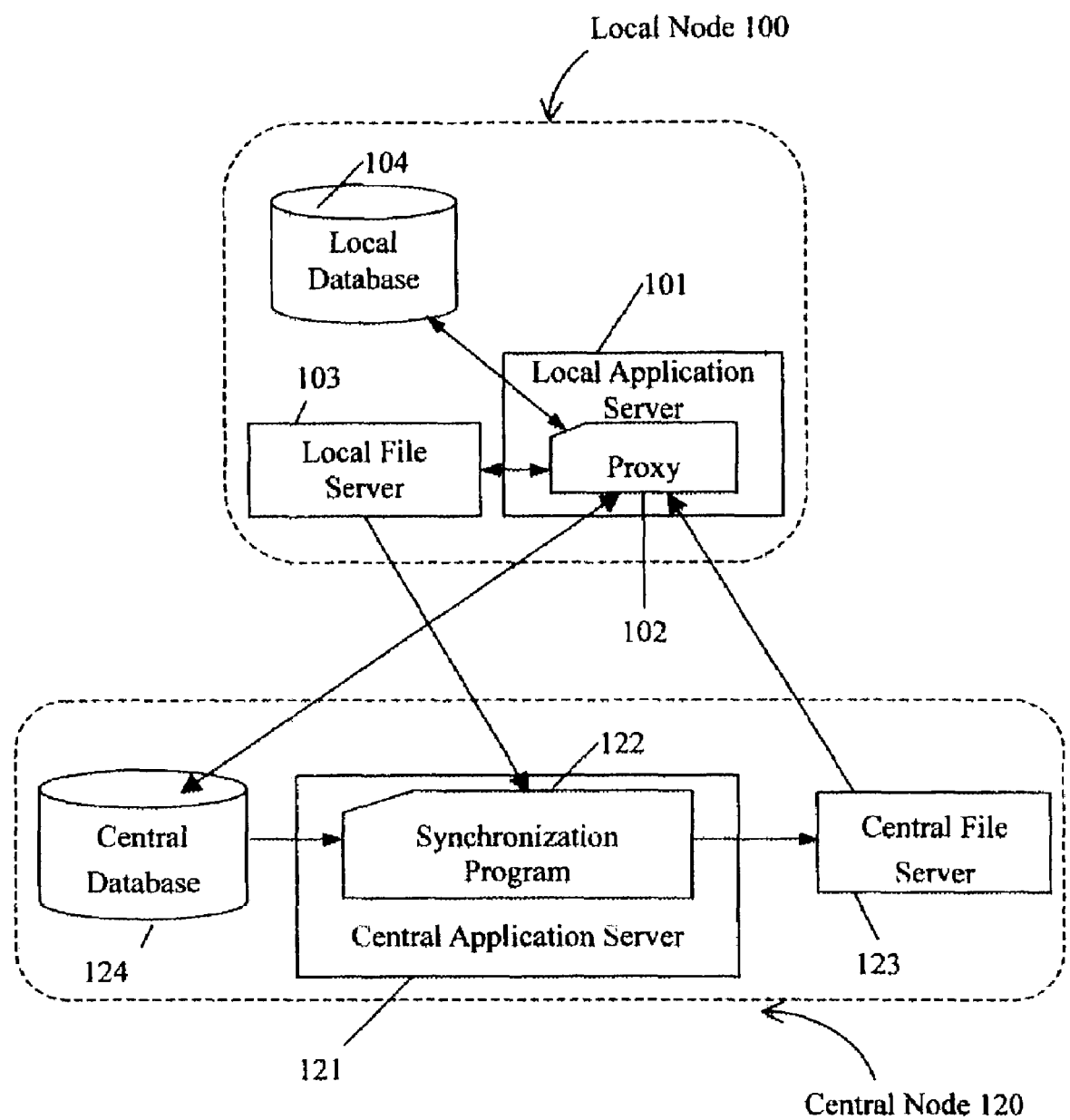
FIG. 2 is a schematic diagram of working principles of said system for synchronizing files in multiple nodes.

FIG. 2 is a schematic diagram of working principles of said system for synchronizing files in multiple nodes. For convenience, only one local node 100 is shown. In a distributed network environment, compiling a file shared by multiple users means compiling a plurality of copies of the shared file respectively used by the users. These copies of the file need to be synchronized in order to maintain consistent content of the file. In the preferred embodiment of the present invention, each local node 100 has one copy of each file that is shared between all local nodes 100, and these copies of files are stored in the relevant local file server 103. If a user updates a copy of a file in the local file server 103, the other copies of the file in other local nodes 100 then need to be updated accordingly by way of file synchronization.

The proxy 102 is a DLL stored in the local application server 101. When an application program running on its local application server 101 needs to rewrite a copy of a file in the local file server 103, the proxy 102 is called to upload the required file to the local file server 103, and to add a new item of update information to the file update annals in the central database 124.

In addition, when an application program running on its local application server 101 needs to read a copy of a file in the local file server 103, the proxy 102 is called to determine whether the copy needs to be updated. If the copy needs to be updated, the proxy 102 downloads the corresponding latest edition of the file from the central file server 123, and updates the copy in the local file server 103.

On the central node 120 side, the synchronization program 122 running on the central application server 121 continuously updates files in the central file server 123. The synchronization program 122 periodically connects with the local file servers 103, downloads updated copies of files, and uploads updated copies of files to the central file server 123 as the latest editions of the corresponding files.

Figures 3, 4, 5:
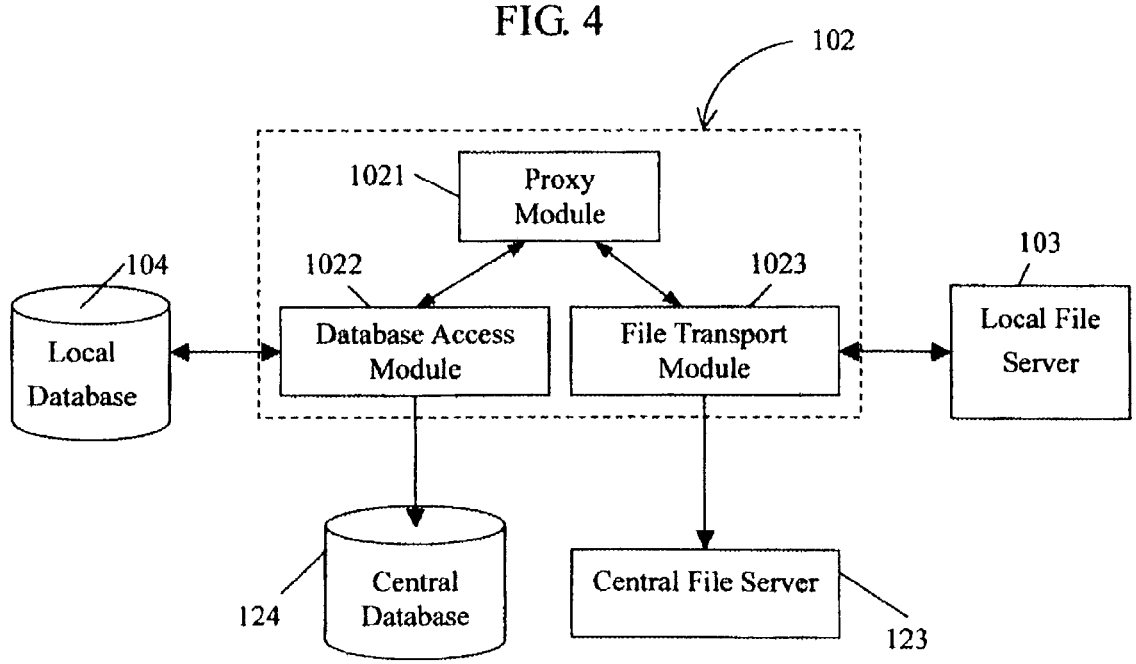
FIG. 3 shows an exemplary local file information table used in accordance with the preferred embodiment of the present invention.
FIG. 4 shows an exemplary file update information table used in accordance with the preferred embodiment of the present invention.
FIG. 5 is a block diagram of function modules of one proxy of said system for synchronizing files in multiple nodes.

FIG. 3 shows an exemplary local file information table used in accordance with the preferred embodiment of the present invention. Normally, in order to provide convenient transportation of files, each local node 100 has one local file information table 130 stored in the relevant local database 104. The local file information table 130 stores essential information on copies of files in the relevant local file server 103. The local file information table 130 comprises the following fields: file serial number 131, file name 132, file directory 133, and update time 134.

File serial number 131 indicates copies of files in the local file server 103. Each copy of a file has a unique serial number. File directory 133 indicates where in the local file server 103 copies of files are stored. Update time 134 indicates when copies of files in the local file server 103 were updated.

FIG. 4 shows an exemplary file update information table used in accordance with the preferred embodiment of the present invention. After updating a copy of a file in the local file server 103, the proxy 102 adds a new item of update information to the file update annals. The file update annals are stored in the file update information table 140 in the central database 124. The file update information table 140 can be read and written by both the proxy 102 and the synchronization program 122. The file update information table 140 comprises the following fields: file serial number 141, file name 142, original directory 143, update time 144, target directory 145, and upload completion 146.

File serial number 141, file name 142, original directory 143 and update time 144 respectively correspond to file serial number 131, file name 132, file directory 133 and update time 134 of the local file information table 130. When the proxy 102 adds a new item of update information to the file update information table 140, said fields 141, 142, 143, 144 are filled out according to the values in the corresponding fields 131, 132, 133, 134 in the local file information table 130. In addition, target directory 145 and upload completion 146 are set to null by the proxy 102. Once the updated copy of the file is uploaded to the central file server 123, the synchronization program 122 fills out said fields 145, 146.

FIG. 5 is a block diagram of function modules of one proxy of said system for synchronizing files in multiple nodes. The proxy 102 comprises a proxy module 1021, a database access module 1022, and a file transport module 1023.

The proxy module 1021 receives file access requests from application programs running on its local application server 101. For each file access request, the proxy module 1021 calls the database access module 1022 to read corresponding items from the local file information table 130 and the file update information table 140 respectively. The proxy module 1021 compares a value in update time 134 and a value in update time 144 for read corresponding items, and determines whether the required file has already been updated. The proxy module 1021 then calls the file transport module 1023.

The database access module 1022 serves as a middle layer between the proxy module 1021 and the local database 104 or the central database 124. The database access module 1022 is used to access the local file information table 130 and the file update information table 140.

The file transport module 1023 serves as a middle layer between the proxy module 1021 and the local file server 103 or the central file server 123. The file transport module 1023 is used for downloading copies of files from the its local file server 103, or for downloading latest editions of files from the central file server 123 and uploading said latest editions of files to the local file server 103.

Figure 6:
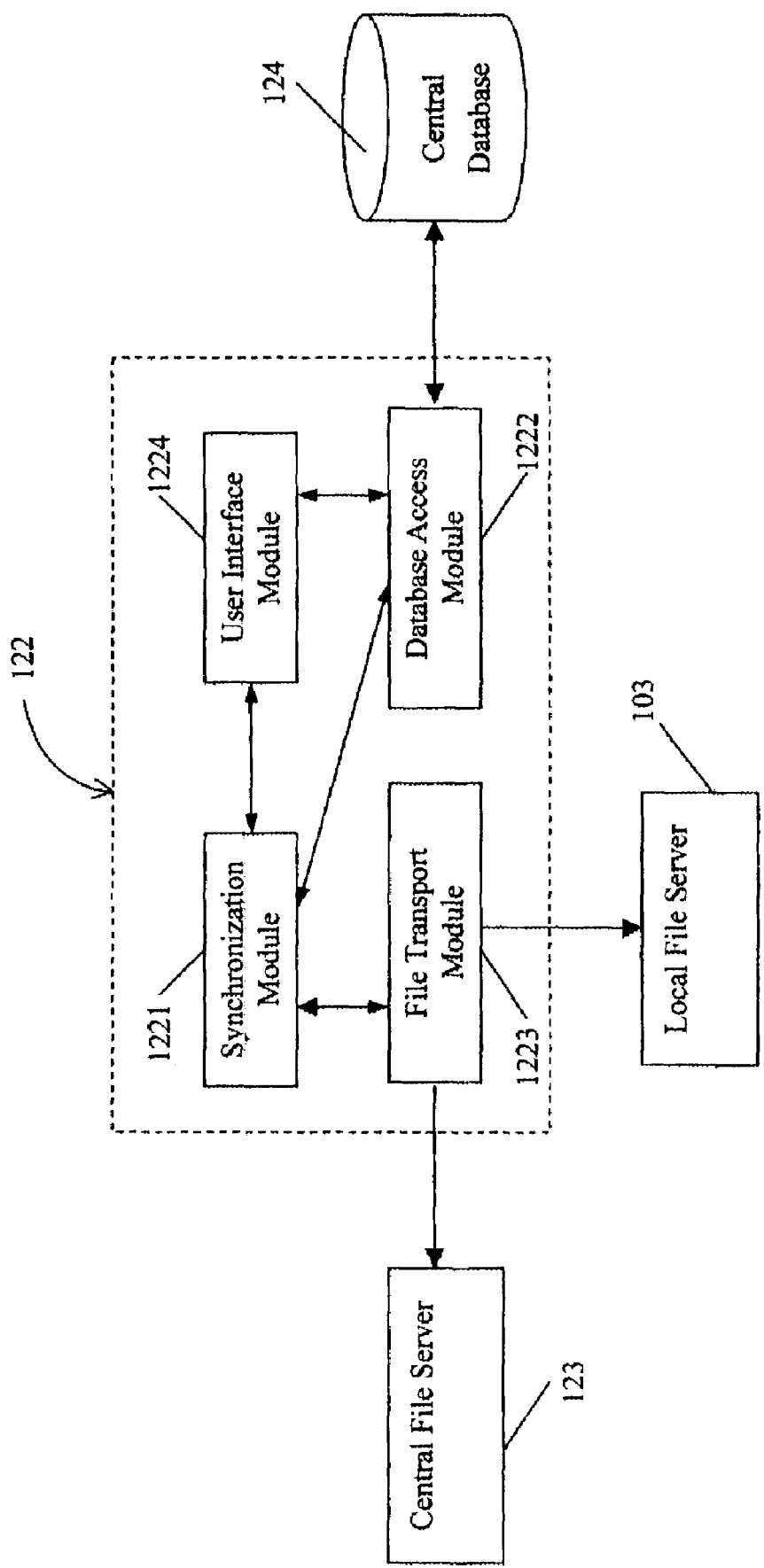
FIG. 6 is a block diagram of function modules of a synchronization program of said system for synchronizing files in multiple nodes.

FIG. 6 is a block diagram of function modules of a synchronization program of said system for synchronizing files in multiple nodes. The synchronization program 122 running on the central application server 121 reads the file update information table 140, downloads updated copies of files from local file servers 103, and uploads said copies as the latest editions of shared files to the central file server 123. The synchronization program 122 comprises a synchronization module 1221, a database access module 1222, a file transport module 1223, and a user interface module 1224.

The synchronization module 1221 communicates with the database access module 1222, the file transport module 1223, and the user interface module 1224. The synchronization module 1221 calls the database access module 1222 to read the file update information table 140, and obtains items from the file update information table 140 that have a value of null in upload completion 146. The synchronization module 1221 reads said items, downloads corresponding updated copies of files from local file servers 103, and uploads said copies of files to the central file server 123. The synchronization module 1221 periodically scans the file update information table 140 to obtain said items. In addition, the file update information table 140 has an index that indicates all items that have a value of null in upload completion 146.

The database access module 1222 is used to access the central database 124, and to read the file update information table 140 including the index thereof.

The file transport module 1223 is used to download updated copies of files from the local file servers 103, and to upload said updated copies of files to the central file server 123.

The user interface module 1224 provides an operating interface for a user. The user interface module 1224 is mainly used to set a period of regular scanning of the file update information table 140 by the synchronization module 1221, and to examine a status of updating of files in the central file server 123 via the file update information table 140.

Figure 7:
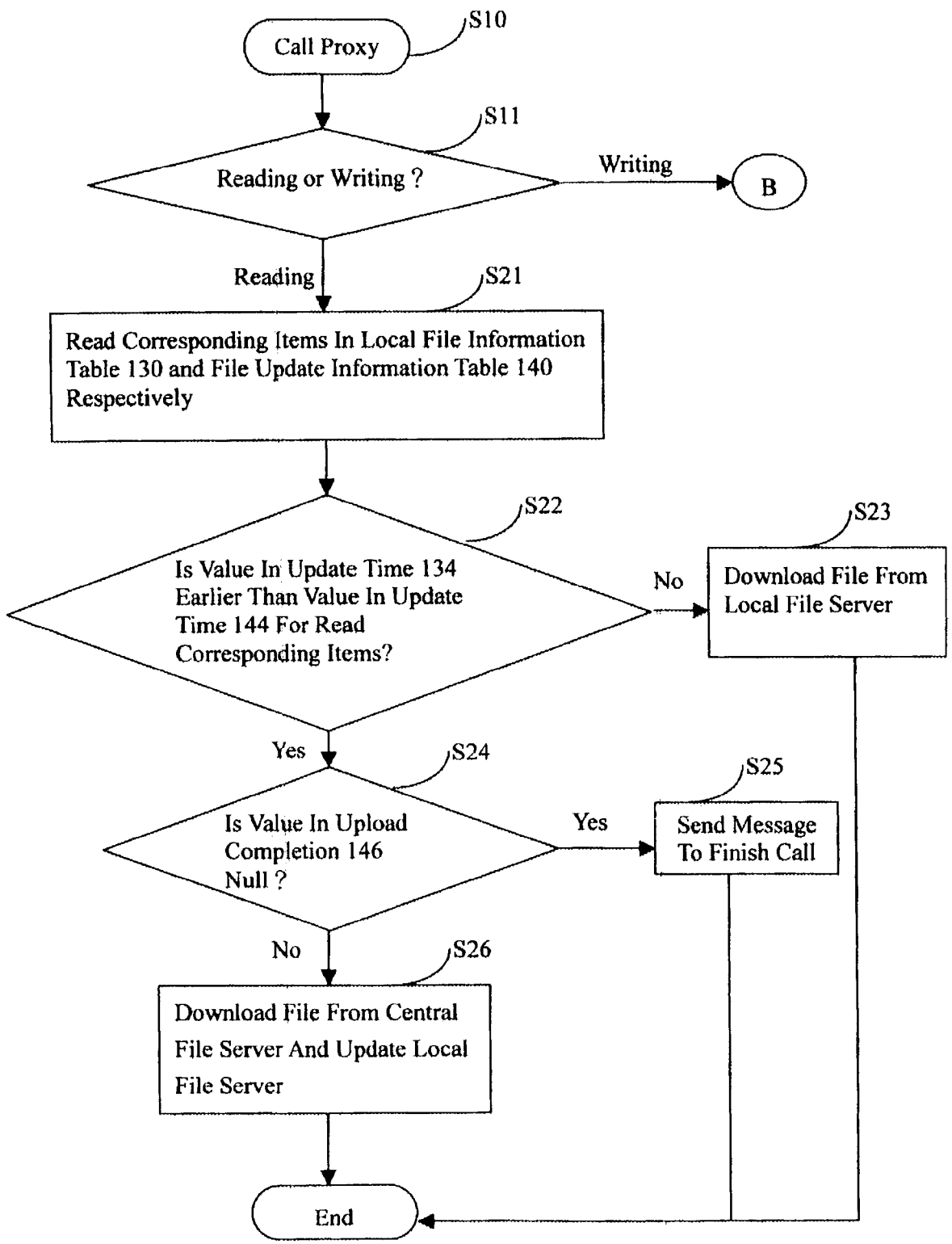
FIGS. 7 and 8 cooperatively comprise a flow chart of operation of said one proxy in accordance with a preferred embodiment of the present invention.
Figure 8:
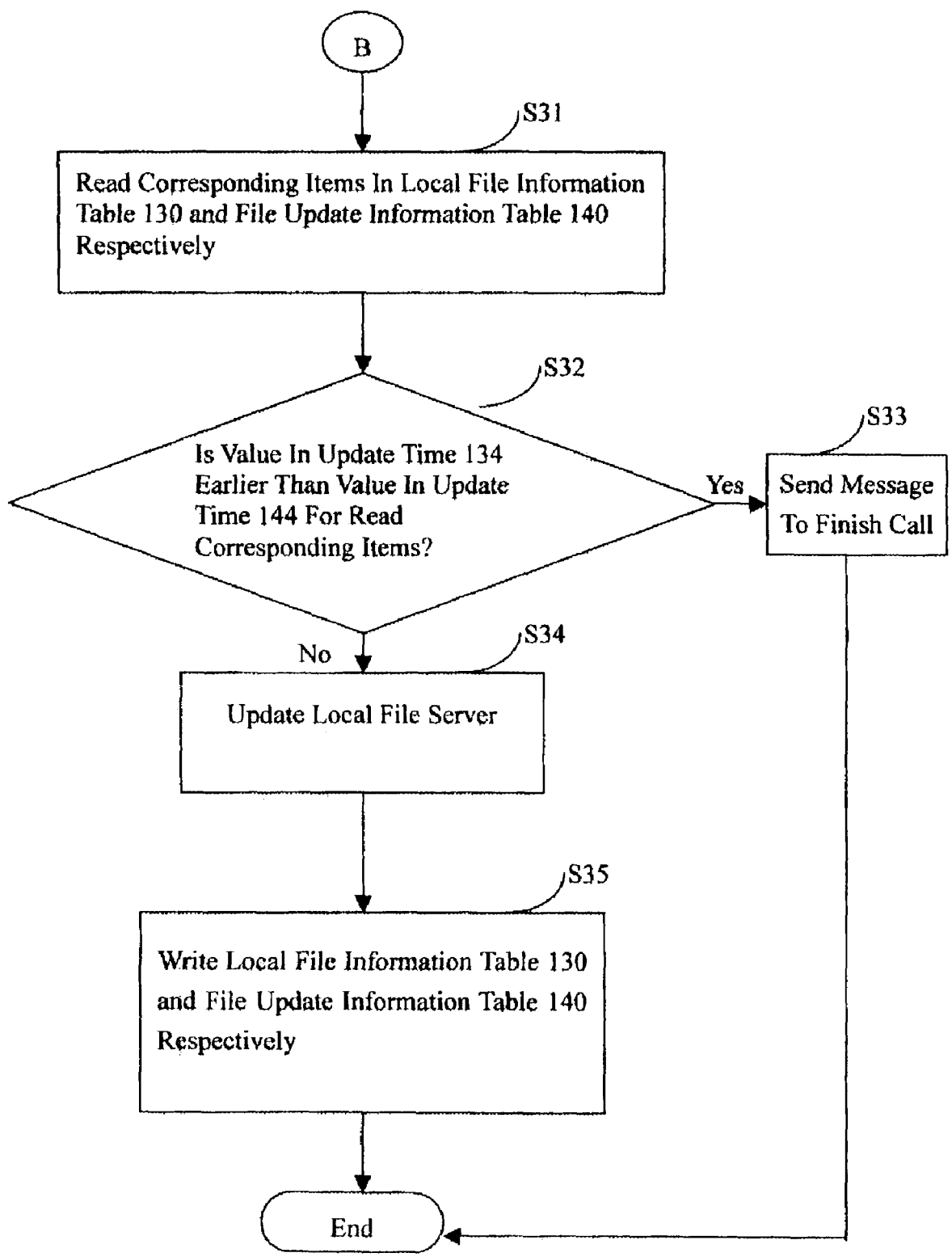

FIGS. 7 and 8 cooperatively comprise a flow chart of operation of the proxy 102 of one local node 100, in accordance with the preferred embodiment of the present invention. First, an application running on the local application server 101 calls the proxy 102 (Step S11). The proxy module 1021 determines whether the application requires reading or writing of a file (Step S11). If reading of a file is required, the proxy module 1021 calls the database access module 1022 to read corresponding items in the local file information table 130 and the file update information table 140 respectively. If there is a plurality of items of the required file in the file update information table 140, only the latest item is read. The latest item is determined according to a value in update time 144 being the latest value (Step S21). The proxy module 1021 compares a value in update time 134 and a value in update time 144 for read corresponding items (Step S22). If the value in update time 134 is not earlier than the value in update time 144, this means that the required file has not been updated by any of the other local nodes 100. Therefore, the corresponding copy of the file in the local file server 103 does not need to be updated. The proxy module 1021 calls the file transport module 1023 to access the local file server 103 in order to download the copy of the required file (Step S23), whereupon the procedure is ended. If the value in update time 134 is earlier than the value in update time 144, this means that the required file has been updated by one of the other local nodes 100. The proxy module 1021 also ascertains whether a value in upload completion 146 for the corresponding item is null (Step S24). If the value in upload completion 146 is null, this means that a latest edition of the required file is not in the central file server 123. The proxy module 1021 sends a message to said application in order to finish the call (Step S25), whereupon the procedure is ended. If the value in upload completion 146 is not null, this means that the latest edition of the required file is in the central file server 123. The proxy module 1021 calls the file transport module 1023 to download the file from the central file server 123, and to upload the file to the local file server 103 in order to update the corresponding copy therein. The proxy module 1021 then resets a value in update time 134 for the corresponding item (Step S26), whereupon the procedure is ended.

However, referring particularly to FIG. 8, if in Step S1 the proxy module 1021 determines that the application requires writing of a file, the proxy module 1021 calls the database module 1022 to read corresponding items from the local file information table 130 and the file update information table 140 respectively. If there is a plurality of items of the required file in the file update information table 140, only the latest item is read. The latest item is determined according to a value in update time 144 being the latest value (Step S31). The proxy module 1021 compares a value in update time 134 and a value in update time 144 for read corresponding items (Step S32). If the value in update time 134 is earlier than the value in update time 144, this means that the required file has been updated by one of the other local nodes 100, and the latest edition of the file has not yet been read by the relevant local node 100. The proxy module 1021 sends a message to said application in order to finish the call (Step S33), whereupon the procedure is ended. If the value in update time 134 is not earlier than the value in update time 144, this means that the required file has not been updated by any of the other local nodes 100. The proxy module 1021 calls the file transport module 1023 to upload the required file to the local file server 103 (Step S34). The proxy module 1021 still calls the database access module 1022 to write the local file information table 130 and the file update information table 140 respectively. Such writing includes resetting a value in update time 134 for the corresponding item in the local file information table 130, and adding one new item to the file update information table 140. In the file update information table 140, the fields 141, 142, 143, 144 are filled out according to corresponding fields 131, 132, 133, 134 of the corresponding item in the local file information table 130. The other two fields in the file update information table 140, namely target directory 145 and upload completion 146, are set to null. The values in update time 134 and update time 144 are equal to the modifying time of the required file (Step S35). The procedure is thus ended.

Figure 9:
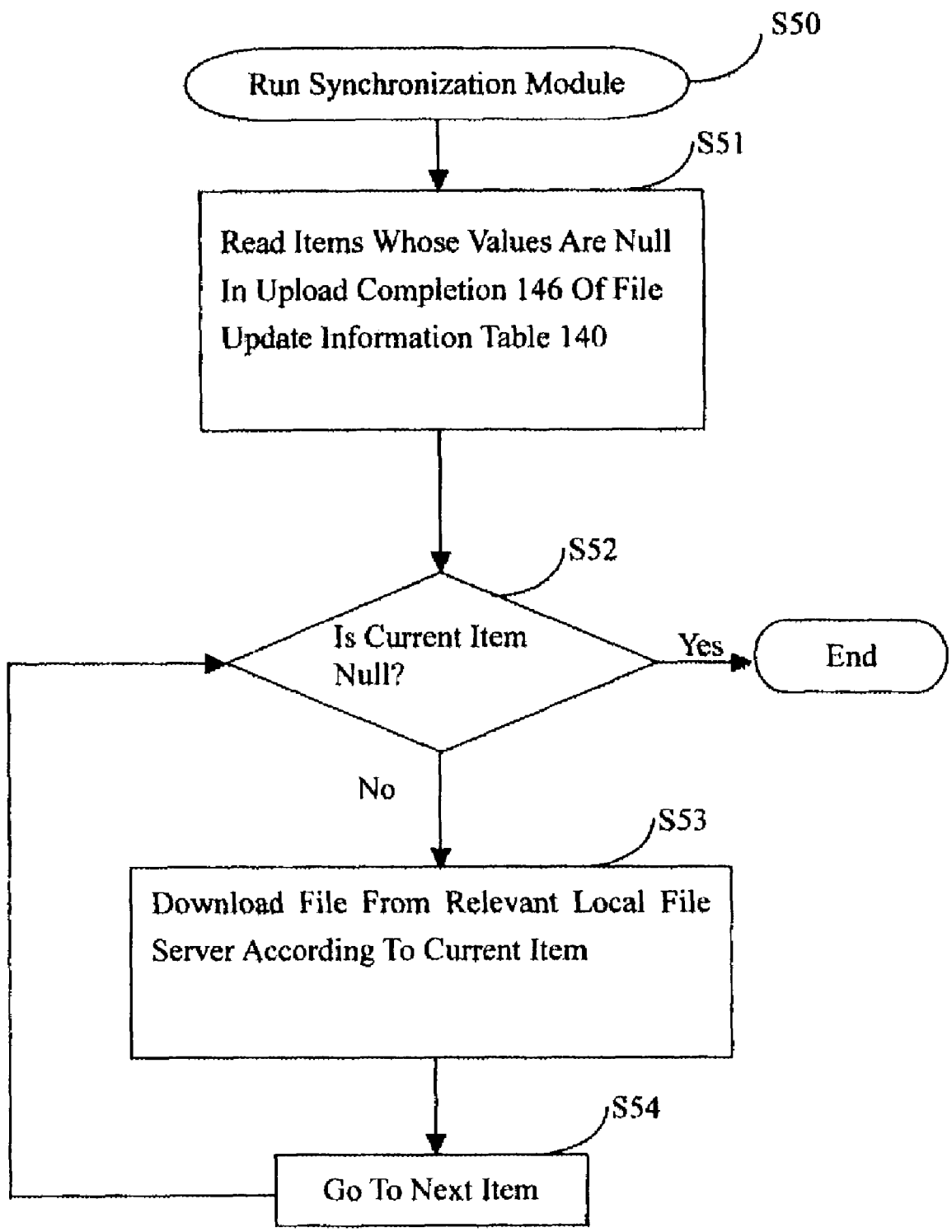
FIG. 9 is a flow chart of operation of said synchronization program in accordance with the preferred embodiment of the present invention.

FIG. 9 is a flow chart of operation of the synchronization program 122 of the central node 120, in accordance with the preferred embodiment of the present invention. First, the synchronization module 1221 begins to run on the central application server 121 at the end of the predefined period (Step S50). The synchronization module 1221 calls the database access module 1222 to read items whose values are null in upload completion 146 of the file update information table 140 (Step S51). The synchronization module 1221 ascertains whether a current item is null (Step S52). If the current item is not null, the synchronization module 1221 reads the values in file serial number 141, file name 142 and original directory 143 for the current item. The synchronization module 1221 calls the file transport module 1223 to download a copy of the file from the relevant local file server 103 according to the read values, and upload said copy of the file to the central file server 123 as the latest edition (Step S53). The synchronization module 1221 then reads a next item by returning to Step S52 (Step S54). If and when the current item is null, this means that there are no more files in the central file server 123 which needing updating, and the procedure is ended.

Although the present invention has been described in language specific to structural features and/or methodological steps, it is to be understood that the invention defined in the appended claims is not necessarily limited to the specific features or steps described above. Rather, the specific features and steps described above are disclosed as preferred forms of implementing the claimed invention.

What is claimed is:

1. A method for synchronizing files in multiple nodes, whereby file synchronization between a plurality of local nodes is performed via a central node, the central node comprising a central application server, a central file server and a central database, and each of the local nodes comprising a local application, a local file server and a local database, the method comprising the following steps:
   (a) storing one copy of each file that is shared between the local nodes;
   (b) creating a first table in each of the local databases to store information on copies of files in its respective local file server;
   (c) creating a second table in the central database to record all update information on copies of files in all the local file servers;
   (d) updating a copy of a file in one of the local file servers;
   (e) adding a new item of update information on the file in the second table;
   (f) downloading the updated copy of the file from said one of the local file servers, and uploading the updated copy of the file to the central file server as the latest edition of the file;
   (g) determining whether a required copy of the file in another of the local file servers needs to be updated; and
   (h) downloading the latest edition of the file from the central file server to update said another of the local file servers if the required copy of the file needs to be updated.

2. The method of claim 1, wherein the first table comprises fields of file name, file directory, and update time.

3. The method of claim 2, wherein the second table comprises fields of file name, original directory, update time, target directory, and upload completion.

4. The method of claim 3, wherein the fields of file name, original directory and update time in the second table correspond with the fields of file name, file directory and update time in the first table respectively.

5. The method of claim 3, wherein step (e) further comprises the step of:
   filling out the fields of file name, original directory and update time for the new item of update information in the second table according to the corresponding fields of the corresponding item in the first table, and setting the files of target directory and upload completion in the second table to null.

6. The method of claim 3, wherein step (f) further comprises the step of:
reading items whose values in the field of upload completion in the second table are null, in order to update the central file server.

7. The method of claim 3, wherein step (g) further comprises the step of:
comparing values in the field of update time for corresponding items in the first table and in the second table in order to determine whether the required copy of the file needs to be updated.

8. A method of synchronizing files based upon a same item in multiple nodes comprising a central node connected with a plurality of local nodes, wherein the central node is equipped with a central application server, a central file server and a central database, and each of said local nodes is equipped with a local application server, a local file server and a local database, the method comprising steps of:
in a READ procedure:

(1) obtaining a file updated time in the local database;
(2) comparing said updated time with that recorded in the central database;
(3) downloading a corresponding file from the local file server if the updated time in the local database is later than that in the central database, or
(4) downloading a corresponding file from the central file server if the updated time in the local database is earlier than that in the central database;

in a WRITE procedure:

(1) obtaining a file updated time in the local database;
(2) comparing said updated time with that recorded in the central database;
(3) uploading the corresponding file from the local file server to the central file server if the updated time in the local database is later than that in the central database, or
(4) warning an editor of the corresponding file regarding other editors having already revised the file from other local nodes if the updated time in the local database is earlier than that in the central database.

* * * * *